United States Patent
Park et al.

(10) Patent No.: US 10,938,023 B2
(45) Date of Patent: *Mar. 2, 2021

(54) METHOD FOR MANUFACTURING ELECTRODE FOR SECONDARY BATTERY AND ELECTRODE OBTAINED THEREFROM

(71) Applicant: LG CHEM, LTD., Seoul (KR)

(72) Inventors: Jun-Soo Park, Daejeon (KR); Young-Hwan Lee, Daejeon (KR); Jae-Hyun Lee, Daejeon (KR)

(73) Assignee: LG Chem, Ltd.

( * ) Notice: Subject to any disclaimer, the term of this patent is extended or adjusted under 35 U.S.C. 154(b) by 119 days.

This patent is subject to a terminal disclaimer.

(21) Appl. No.: 16/070,033

(22) PCT Filed: Sep. 11, 2017

(86) PCT No.: PCT/KR2017/009958
§ 371 (c)(1),
(2) Date: Jul. 13, 2018

(87) PCT Pub. No.: WO2018/048277
PCT Pub. Date: Mar. 15, 2018

(65) Prior Publication Data
US 2019/0036105 A1    Jan. 31, 2019

(30) Foreign Application Priority Data
Sep. 9, 2016  (KR) .................. 10-2016-0116598

(51) Int. Cl.
*H01M 4/139*  (2010.01)
*H01M 4/04*  (2006.01)
(Continued)

(52) U.S. Cl.
CPC ......... *H01M 4/139* (2013.01); *H01M 4/0404* (2013.01); *H01M 4/0471* (2013.01);
(Continued)

(58) Field of Classification Search
CPC .......... H01M 10/3927; H01M 4/0407; H01M 4/366; H01M 2300/0099; H01M 10/0525;
(Continued)

(56) References Cited

U.S. PATENT DOCUMENTS

2007/0240300 A1    10/2007  Hasei
2009/0301866 A1*   12/2009  Zaghib ................. H01M 4/621
                                                  204/242

(Continued)

FOREIGN PATENT DOCUMENTS

CN    101055926 A    10/2007
CN    103779538 A    5/2014
(Continued)

OTHER PUBLICATIONS

Modeling and analysis of solvent removal during Li-ion battery electrode drying; Naresh Susarla, Shabbir Ahmed, Dennis W Dees; Chemical Sciences and Engineering Devision, Argonne National Labratory.*

(Continued)

*Primary Examiner* — Brian R Ohara
*Assistant Examiner* — Rachel L Zhang
(74) *Attorney, Agent, or Firm* — Lerner, David, Littenberg, Krumholz & Mentlik, LLP

(57) ABSTRACT

The present disclosure relates to a method for manufacturing an electrode for a secondary battery, including the steps of: (i) preparing a first electrode mixture for primary coating and a second electrode mixture for secondary coating; (ii) coating the first electrode mixture onto an electrode current collector and carrying out drying; and (iii) coating the second electrode mixture onto the first electrode mixture and carrying out drying in such a manner that the drying rate of the second electrode mixture is lower than the drying rate of the first electrode mixture in step (ii).

4 Claims, 2 Drawing Sheets

(51) Int. Cl.
*H01M 4/36* (2006.01)
*H01M 4/13* (2010.01)
*H01M 10/0525* (2010.01)

(52) U.S. Cl.
CPC .............. *H01M 4/13* (2013.01); *H01M 4/366* (2013.01); *H01M 10/0525* (2013.01)

(58) Field of Classification Search
CPC .... H01M 4/0404; H01M 4/0471; H01M 4/13; H01M 4/139
See application file for complete search history.

(56) References Cited

U.S. PATENT DOCUMENTS

| | | | |
|---|---|---|---|
| 2012/0009475 | A1 | 1/2012 | Nakura |
| 2012/0100402 | A1* | 4/2012 | Nesper ................. H01M 4/131 429/48 |
| 2013/0157130 | A1 | 6/2013 | Tamaki et al. |
| 2013/0170100 | A1 | 7/2013 | Lee et al. |
| 2014/0113066 | A1 | 4/2014 | Fujita |
| 2014/0212749 | A1* | 7/2014 | Choi ....................... C01G 53/50 429/211 |
| 2015/0004487 | A1 | 1/2015 | Lee et al. |
| 2016/0190552 | A1* | 6/2016 | Murata ................... C01B 32/05 429/231.8 |
| 2017/0263927 | A1 | 9/2017 | Kim et al. |

FOREIGN PATENT DOCUMENTS

| | | |
|---|---|---|
| CN | 104205426 A | 12/2014 |
| JP | 2008-28028 A | 2/2008 |
| JP | 2010282873 A | 12/2010 |
| JP | 2014-130742 A | 7/2014 |
| KR | 10-1214727 B1 | 12/2012 |
| KR | 10-2015-0071453 A | 6/2015 |
| KR | 20150071453 A | 6/2015 |
| KR | 10-1583120 B1 | 1/2016 |
| WO | WO 2016/133345 A1 | 8/2016 |
| WO | WO 2018/016785 A1 | 1/2018 |

OTHER PUBLICATIONS

Evaporation Rated, Condensation Rates, and Relative Humidity; METEO 3: Introductory Meterology; https: www.e-education.psu.edu/nneteo3/print/book/export/html/1981 (Year: 1981).*
International Search Report (PCT/ISA/210) issued in PCT/KR2017/009958, dated Mar. 29, 2018.
Chinese Search Report for Application No. 2017800109330 dated Aug. 5, 2020, 2 pages.

* cited by examiner

METHOD FOR MANUFACTURING ELECTRODE FOR SECONDARY BATTERY AND ELECTRODE OBTAINED THEREFROM

TECHNICAL FIELD

The present application claims priority to Korean Patent Application No. 10-2016-0116598 filed on Sep. 9, 2016 in the Republic of Korea, the disclosures of which are incorporated herein by reference.

The present disclosure relates to a method for manufacturing an electrode for a secondary battery and an electrode obtained therefrom.

BACKGROUND ART

As technological development and a need for mobile instruments have increased, a demand for secondary batteries as energy sources has increased rapidly. Among such secondary batteries, lithium secondary batteries having high energy density and voltage, long cycle life and a low self-discharging rate have been commercialized and used widely.

In addition, recently, as the attention to environmental problems has increased, there has been grown the market of systems such as electric vehicles (EV) and hybrid electric vehicles (HEV) capable of substituting for vehicles using fossil fuel, including gasoline vehicles and diesel vehicles, one of the main causes of air pollution. Thus, as a power source for such electric vehicles (EV) and hybrid electric vehicles (HEV), a lithium secondary battery having high energy density, high discharge voltage and output stability has been studied and used generally.

A lithium secondary battery includes an electrode assembly having a positive electrode and a negative electrode each of which includes an active material coated on an electrode current collector and a porous separator interposed between the positive electrode and the negative electrode, and a lithium salt-containing non-aqueous electrolyte injected thereto.

An electrode for such a secondary battery is obtained by applying an electrode mixture in a form of slurry containing an electrode active material, a conductive material, a binder polymer, or the like mixed in an organic solvent to an electrode collector, followed by drying and pressing.

Lithium secondary batteries that are still being developed gradually require high capacity and high output. To satisfy this, it is required to reduce the use of a binder polymer. However, there is a limitation in reducing the amount of a binder considering the current adhesion level of a binder polymer. When the amount of a binder polymer is insufficient, adhesion to an electrode current collector, particularly adhesion to copper foil in a negative electrode is decreased, and thus a possibility of detachment of an electrode is increased during the cutting of an electrode or during charge/discharge of a battery. In addition, it is observed that adhesion between an electrode current collector and an active material is lower than active material-active material cohesion due to the migration of a binder polymer while coating the electrode mixture. For this, a binder polymer is used in an excessive amount higher than the actually required amount to ensure the minimum adhesion between an electrode current collector and an active material.

To solve this, dual coating is carried out by carrying out coating of an electrode mixture twice. However, although such dual coating improves adhesion between an active material layer and a negative electrode current collector, it is disadvantageous in that interfacial adhesion between a first electrode active material layer and a second electrode active material layer is decreased. When adhesion between electrode active material layers is decreased, interfacial separation occurs during charge/discharge of a lithium secondary battery, which may cause reducing the capacity of a battery.

In addition, in the case of a battery in which the second electrode active material layer is thicker than the first electrode active material layer, a binder polymer is distributed largely on the surface of an electrode, which may become a cause of increasing the resistance of an electrode during charge/discharge.

DISCLOSURE

Technical Problem

The present disclosure is designed to solve the above-mentioned problems and technical problems required to be solved from the past.

After the inventors of the present disclosure have conducted many studies and various experiments, we have found that when an electrode mixture is divided into two portions and coated for the manufacture of an electrode in such a manner that a preliminarily coated electrode mixture is allowed to be dried at a lower rate or for a longer time as compared to a subsequently coated electrode mixture, it is possible to obtain a desired effect, as described hereinafter. The present disclosure is based on this finding.

Technical Solution

In one aspect of the present disclosure, there is provided a method for manufacturing an electrode for a secondary battery, including the steps of: (i) preparing a first electrode mixture for primary coating and a second electrode mixture for secondary coating; (ii) coating the first electrode mixture onto an electrode current collector and carrying out drying; and (iii) coating the second electrode mixture onto the first electrode mixture and carrying out drying in such a manner that the drying rate ('second drying rate') of the second electrode mixture is lower than the drying rate ('first drying rate') of the first electrode mixture in step (ii).

In the method, each of the drying rates of the first electrode mixture and the second electrode mixture is 0.1-30 mg/sec, and the drying rate of the second electrode mixture is set to be lower than the drying rate of the first electrode mixture.

As used herein, 'drying rate' may be expressed by the amount (weight) of the solvent which is contained in each of the first electrode mixture and the second electrode mixture and then removed for a unit time by drying, and the unit of drying rate is "mg/sec". According to the present disclosure, drying conditions may not be particularly limited as long as they satisfy the above-defined drying rates.

The first electrode mixture and the second electrode mixture may have the same ingredients and compositional ratio.

In the method, the amount of the binder in the first electrode mixture may be 2-10% based on the total weight of the solid content of the first electrode mixture, and the amount of the binder in the second electrode mixture is smaller than that of the binder in the first electrode mixture and may be 1-9% based on the total weight of the solid content of the second electrode mixture.

In another aspect of the present disclosure, there is also provided an electrode for a secondary battery obtained by the above-described method and including an electrode current collector, a first electrode active material layer formed from a first electrode mixture and a second electrode active material layer formed from a second electrode mixture, wherein interfacial adhesion strength between the first electrode active material layer and the second electrode active material layer is larger than interfacial adhesion strength between the current collector and the first electrode active material layer.

Herein, methods for determining 'interfacial adhesion strength' are not particularly limited and any methods used conventionally in the art may be used. Preferably, a peel-off test is carried out as follows: two materials, A and B, interfacial adhesion strength each of which is to be determined are prepared, and are subjected to interfacial adhesion between them, one side of a double-sided tape is attached onto a glass plate, A or B is attached to the other side of the double-sided tape, and then B or A is peeled by drawing it at 180° under a constant drawing rate. Then, the force required for peeling is measured by a universal test machine (UTM).

In the electrode, the first electrode active material layer and the second electrode active material layer may have a thickness ratio of 1:9-5:5.

The electrode may be a negative electrode.

Advantageous Effects

As described above, according to the method for manufacturing an electrode for a secondary battery of the present disclosure, an electrode mixture is coated twice by dividing it into a first electrode mixture and a second electrode mixture in such a manner that the second drying rate of the second electrode mixture may be lower than the first drying rate of the first electrode mixture. In this manner, cohesion between the first electrode active material layer and the second electrode active material layer is increased and migration of the binder polymer occurring in the second electrode active material layer is decreased, thereby providing an effect of reducing the surface resistance of an electrode.

According to the present disclosure, particularly even when one kind of electrode mixture slurry is used for manufacturing a high-loading electrode, it is possible to improve adhesion between the electrode current collector and the electrode active material layer (the first electrode active material layer) and adhesion between the first electrode active material layer and the second electrode active material layer. Thus, the present disclosure gives an advantage in that there is no need for preparing two or more kinds of electrode mixture slurry having a different binder content, when manufacturing a high-loading electrode.

BEST MODE

Figure 1:
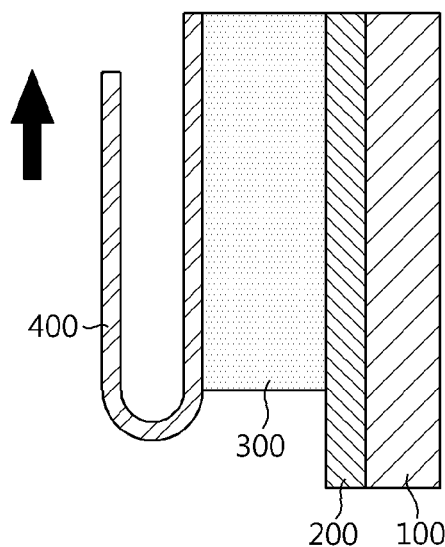
FIG. 1 is a schematic sectional view illustrating a method for determining interfacial adhesion strength between a first electrode active material layer and an electrode current collector.

Hereinafter, particular embodiments of the present disclosure will be described in detail. However, it should be understood that the present disclosure is not limited thereto but is defined by the scope of the following claims.

In one aspect, there is provided a method for manufacturing an electrode for a secondary battery including an electrode mixture coated on either surface or both surfaces of an electrode current collector, the method including the steps of:

(i) preparing a first electrode mixture for primary coating and a second electrode mixture for secondary coating;

(ii) coating the first electrode mixture onto an electrode current collector and carrying out drying; and (iii) coating the second electrode mixture onto the first electrode mixture and carrying out drying in such a manner that the drying rate of the second electrode mixture is lower than the drying rate of the first electrode mixture, in step (ii).

In step (i), the first electrode mixture and the second electrode mixture are prepared.

Each of the first electrode mixture and the second electrode mixture includes an electrode active material, a binder polymer and a solvent (dispersion medium), and if desired, may further include additives used conventionally in the art.

It is preferred that the first electrode mixture and the second electrode mixture are prepared by using the same ingredients and composition, i.e., are prepared in a single container, since this eliminates processing inconvenience of preparing the first electrode mixture and the second electrode mixture individually.

The electrode obtained from the electrode mixture may be a positive electrode including a positive electrode active material or a negative electrode including a negative electrode active material. The effect of the present disclosure can be realized more significantly when the present disclosure is applied to a negative electrode.

The positive electrode is obtained by applying a mixture of a positive electrode active material, a conductive material and a binder onto a positive electrode current collector, followed by drying and pressing. If desired, a filler may be further added to the mixture.

The active material that may be used in the positive electrode is based on a lithium intercalation material, such as lithiated manganese oxide, lithiated cobalt oxide, lithiated nickel oxide or a composite oxide formed by a combination thereof, and such an active material may be bound to a positive electrode current collector to form the positive electrode.

In general, the positive electrode current collector is provided with a thickness of 3-500 μm. The positive electrode current collector is not particularly limited, as long as it has high conductivity while not causing any chemical change in the corresponding battery. For example, it is possible to use stainless steel, aluminum, nickel, titanium, baked carbon, or aluminum or stainless steel surface treated with carbon, nickel, titanium, silver, etc. The current collector may have fine surface irregularities to increase the adhesion of the positive electrode active material thereto, and may have various shapes, such as a film, sheet, foil, net, porous body, foam, and non-woven body.

Particular examples of the negative electrode active material that may be used for the negative electrode include, for example, carbon such as non-graphitizable carbon or graphite-based carbon; metal composite oxides, such as $Li_xFe_2O_3$ ($0 \leq x \leq 1$), $Li_xWO_2$ ($0 \leq x \leq 1$), $Sn_xMe_{1-x}Me'_yO_z$(Me: Mn, Fe, Pb, Ge; Me': Al, B, P, Si, elements of Group 1, 2 or 3, halogen; $0 < x \leq 1$; $1 \leq y \leq 3$; $1 \leq z \leq 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like.

In general, the negative electrode current collector is formed to have a thickness of 3-500 μm. The negative electrode current collector is not particularly limited, as long as it has conductivity while not causing any chemical change in the corresponding battery. For example, it is possible to use copper, stainless steel, aluminum, nickel, titanium, baked carbon, copper or stainless steel surface treated with carbon, nickel, titanium, silver, etc., aluminum-cadmium alloy, or the like. In addition, like the positive electrode current collector, the negative electrode current collector may have fine surface irregularities to reinforce the binding force of the negative electrode active material, and may have various shapes, such as a film, sheet, foil, net, porous body, foam, non-woven body, or the like.

The binder polymer is an ingredient which assists the binding of an active material with a conductive material, or the like, and the binding to a collector. The binder polymer may be any one selected from the group consisting of polyvinylidene fluoride-co-hexafluoropropylene, polyvinylidene fluoride-co-trichloroethylene, polyvinylidene fluoride-co-chlorotrifluoroethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxymethyl cellulose, styrene-butadiene copolymer, acrylonitrile-styrene-butadiene copolymer and polyimide, or a combination of two or more of them. In the negative electrode, a binder, such as carboxymethyl cellulose, styrene-butadiene copolymer and an acrylate compound, used in combination with an aqueous solvent may be used preferably.

The binder polymer may be used in an amount of 1-15 wt % based on the total weight of the solid content of the electrode mixture.

The solvent that may be used for the electrode mixture is not particularly limited, as long as it allows dissolution or dispersion of a binder polymer while dispersing inorganic particles and it can disperse and dissolve the binder. Preferably, a solvent having a low boiling point is preferred, since such a solvent is removed with ease subsequently. Non-limiting examples of solvents that may be used herein include acetone, tetrahydrofuran, methylene chloride, chloroform, dimethyl formamide, N-methyl-2-pyrrolidone (NMP), cyclohexane, water or a mixture thereof. Particularly, water is preferred as a solvent for negative electrode active material slurry. The solvent may be used in a sufficient amount so that it dissolves or disperses the electrode active material, conductive material and binder and has a viscosity capable of providing high thickness uniformity upon the application of an electrode mixture.

In general, the conductive material is added in an amount of 1-50 wt % based on the total weight of the mixture containing a positive electrode active material. The conductive material is not particularly limited, as long as it has conductivity while not causing any chemical change in the corresponding battery. Particular examples of the conductive material include: graphite, such as natural graphite or artificial graphite; carbon black, such as carbon black, acetylene black, ketjene black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; metal oxides, such as titanium oxide; conductive materials, such as polyphenylene derivatives; or the like.

The filler is an ingredient inhibiting swelling of a positive electrode and is used optionally. The filler is not particularly limited, as long as it causes no chemical change in the corresponding battery. Particular examples of the filler include: olefin polymers, such as polyethylene or polypropylene; and fibrous materials, such as glass fibers or carbon fibers.

The first electrode mixture and the second electrode mixture may have the same ingredients and compositional ratio. Thus, it is possible to simplify the process and to improve the interfacial adhesion between the first electrode mixture and the second electrode mixture through the process according to the present disclosure.

Otherwise, the first electrode mixture and the second electrode mixture may be prepared to have different compounds or compositional ratio thereof, such as ingredients and/or content of the binder polymer.

In a non-limiting embodiment, the binder polymer of the first electrode mixture may be styrene-butadiene rubber containing styrene-derived structural repeating units and butadiene-derived structural repeating units in a total amount of 50 wt % or more, and the binder polymer of the second electrode mixture may be a (meth)acrylate polymer containing styrene-derived structural repeating units and (meth)acrylic ester structural repeating units, wherein the amount of the (meth)acrylic ester structural repeating units is 60-90 wt %.

In another non-limiting example, the first electrode mixture includes the binder polymer in an amount of 2-10% based on the total weight of solid content in the first electrode mixture and the second electrode mixture includes a binder polymer in an amount less than the binder polymer content in the first electrode mixture, for example, in an amount of 1-9% based on the total weight of solid content in the second electrode mixture. Herein, 'solid content' means materials other than the solvent and may include an active material, conductive material, binder, or the like.

The first electrode mixture and the second electrode mixture may be provided for coating in such an amount that the second electrode active material layer formed from the second negative electrode active material is thicker than the first electrode active material layer formed from the first negative electrode active material in order to optimize the properties of a binder polymer required depending on the thickness of an electrode. For example, the thickness (height) ratio of the first electrode active material layer and the second electrode active material is 1:9~3:7 or 1:7~1:5.

For example, with the proviso that the above-described thickness ratio is satisfied, the electrode mixture is prepared so that the electrode active material layer formed from the second electrode mixture may have an average thickness of 10-1000 μm, 20-500 μm, or 30-300 μm. Each of the first electrode mixture and the second electrode mixture may be independently applied to the current collector or the first electrode active material layer in a packing density of 2 $mg/cm^2$-20 $mg/cm^2$.

In steps (ii) and (iii), the first electrode mixture is coated and dried on the current collector to form an electrode layer, and then the second electrode mixture is further coated and dried thereon, wherein the second electrode mixture is allowed to be dried at a lower rate or for a longer time as compared to the first electrode mixture.

According to the present disclosure, a first coating system connected to a first electrode mixture supplying unit is provided to apply an electrode mixture to a current collector, and a first drying oven is located in the downstream of the first coating system. In addition, a second coating system connected to a second electrode mixture supplying unit is located in the downstream of the first drying oven, and a second drying oven is located in the downstream of the second coating system. The electrode current collector is conveyed through a conveyor. After the first electrode mixture is coated on the electrode current collector through the first coating system, it is dried in the first drying oven to form a first active material layer. Then, the second electrode mixture is coated on the first active material layer from the second coating system, and the second electrode mixture is dried through the second drying oven to form a second active material layer.

Methods for coating the first electrode mixture and the second electrode mixture may be selected from the known methods considering the properties of electrode mixture ingredients or may be new adequate methods. For example, a method for homogeneous dispersion using a doctor blade may be used, or die casting, comma coating and others may be used.

Each of the first drying oven and the second drying oven may include a preheating zone, a constant-rate drying zone and a reduced-rate drying zone. The preheating zone is one for heating an electrode mixture layer at room temperature to the evaporation temperature of the solvent. The constant-rate drying zone is one for carrying out evaporation of the solvent on the surface of the electrode mixture layer and reducing the solvent content contained in the electrode mixture layer substantially linearly. It is typically understood that the reduced-rate drying zone is one for allowing the solvent in the micropores among the particles forming the electrode mixture layer (or active material layer) to evaporate mildly.

According to the present disclosure, the drying rate of the first electrode mixture and that of the second electrode mixture are set to be different from each other in the constant-rate drying zone. This is because binder migration occurs actively in the constant-rate drying zone.

According to the present disclosure, drying of the first electrode mixture and that of the second electrode mixture are carried out under the same temperature, humidity and atmosphere conditions. It is to be understood that the solvent of the electrode mixture is dried substantially completely after the constant-rate drying.

According to an embodiment of the present disclosure, the first electrode mixture and the second electrode mixture are allowed to pass through drying ovens, more particularly, constant-rate drying zone, having the same length at a different rate so that the amount of solvent dried per unit time may be controlled. For example, when the time during which the second electrode mixture passes through the drying ovens, more particularly, constant-rate drying zone, is set to be longer than the time during which the first electrode mixture passes through the drying ovens, more particularly, constant-rate drying zone, it is possible to control the amount of solvent dried per unit time. For example, the second electrode mixture drying time may be 2-3 times longer than the first electrode mixture drying time. Particularly, when the drying oven for drying the electrode mixtures has a length of 10 m, the first electrode mixture is dried by allowing it to pass through the 10 m drying oven for 5 minutes and the second electrode mixture is dried by allowing it to pass through the 10 m drying oven for 10 minutes. In this manner, the first electrode mixture and the second electrode mixture have a different drying time and thus a different amount of solvent dried per unit time. In a non-limiting example, the drying rate of the first electrode mixture in the constant-rate drying zone may be set to 0.1 m/min to 10 m/min and that of the second electrode mixture may be set to 0.1 m/min to 10 m/min, with the proviso that the drying rate of the second electrode mixture is lower than the drying rate of the first electrode mixture. In this case, there is no particular limitation in the size and number of the drying oven, and different designs of drying ovens may be used depending on electrode size, electrode mixture ingredients, electrode mixture coating amount, or the like. For example, a drying system may be designed so that 2-10 drying ovens having a length of 10-15 m, respectively, may form a constant-rate drying zone and one drying oven having a length of 10-15 m may form a reduced-rate drying zone.

In each of the first drying oven and the second drying oven, the drying temperature may be set independently to 50° C. or more, 80° C. or more, or 100° C. or more so that detachment or disintegration of electrode active material layer hardly occur and manufacturing productivity improves at the same time. Particularly, when using an organic solvent having a high boiling point, the drying temperature may be set to 120° C. or more, or 140° C. or more. For prevention of cracking in an electrode active material layer or oxidation of an electrode current collector, the drying temperature may be set to 200° C. or less, or 180° C. or less. The temperature may be applied to both the positive electrode mixture and the negative electrode mixture.

The evaporation rate (drying rate) of the solvent may be adjusted by the pressure of atmosphere (pressure in the drying oven), drying temperature and relative humidity. In general, when the other conditions are equivalent, the drying rate tends to be increased as the pressure of atmosphere is decreased and/or the drying temperature is increased.

Preferably, the drying rate of the reduced-rate drying zone is set to 1 mg/sec or more (typically 1.5 mg/sec or more, preferably 2 mg/sec or more) for completing the reduced-rate drying in a short time. In addition, for preventing the oxidation of a current collector surface, the drying rate is preferably adjusted to 5 mg/sec or less (typically 3 mg/sec or less, preferably 2.8 mg/sec or less).

According to an embodiment of the present disclosure, the drying rate of the first electrode mixture is set to 0.1-30 mg/sec and that of the second electrode mixture is set to 0.1-30 mg/sec, with the proviso that the drying rate of the second electrode mixture may be lower than the drying rate of the first electrode mixture by 10-20 mg/sec, or the drying rate of the second electrode mixture may be 30-50% of the drying rate of the first electrode mixture. Herein, each of the drying rates of the first electrode mixture and the second electrode mixture means the drying rates thereof in the constant-rate drying zone. When the drying rates are set in the above-mentioned manner, upward migration of the binder polymer of the second electrode mixture is reduced, resulting in reduction of difference in distribution of the binder polymer between the upper portion and the lower portion of the second electrode active material layer. As a result, the problem of reduction of adhesion at the interface between the first electrode active material layer and the second electrode active material layer is solved, and thus the problem of an increase in resistance caused by the binder polymer on the electrode surface can also be solved.

Meanwhile, the pressure of atmosphere in the drying oven for drying the first electrode mixture and the pressure of atmosphere in the drying oven for drying the second electrode mixture may be the same, and may be ambient pressure of 1 atm, for example.

In addition, the drying oven in which the first electrode mixture and the second electrode mixture are dried may be maintained at a dew point of $-10°$ C. or less.

Drying in each of the first drying oven and the second drying oven may be carried out in the conventional manner, for example, by hot air drying.

Otherwise, according to another embodiment of the present disclosure, the drying rate of the first electrode mixture may be the same as the drying rate of the second electrode mixture, and the drying temperature of the second electrode mixture is set to be lower than the drying temperature of the first electrode mixture so that the second electrode mixture may be dried for a longer time.

The method for manufacturing an electrode may further include carrying out pressing after the second electrode mixture is dried.

In another aspect, there is provided an electrode for a secondary battery obtained by the above-described method.

The secondary battery may be a lithium secondary battery including an electrode assembly having a positive electrode, a negative electrode and a separator interposed between both electrodes, and a lithium salt-containing electrolyte injected thereto.

The separator is interposed between the positive electrode and the negative electrode and may be a thin film having insulation property and high ion permeability and mechanical strength, but is not limited thereto. The separator may generally have a pore diameter of 0.01-10 μm and a thickness of 5-300 μm. Particular examples of such a separator include a sheet or non-woven web made of: olefin polymers, such as chemical resistant and hydrophobic polypropylene; glass fibers or polyethylene; or the like. When a solid electrolyte, such as a polymer, is used as an electrolyte, the solid electrolyte may also function as a separator.

The lithium salt-containing electrolyte may include an electrolyte and a lithium salt. Particular examples of the electrolyte may include a non-aqueous organic solvent, organic solid electrolyte, inorganic solid electrolyte, or the like, but are not limited thereto.

Particular examples of the non-aqueous organic solvent may include aprotic organic solvents, such as N-methyl-2-pyrrolidinone, propylene carbonate, ethylene carbonate, butylene carbonate, dimethyl carbonate, diethyl carbonate, γ-butyrolactone, 1,2-dimethoxyethane, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulforan, methylsulforan, 1,3-dimethyl-2-imidazolidinone, propylene carbonate derivatives, tetrahydrofuran derivatives, ether, methyl propionate, ethyl propionate, or the like.

Particular examples of the organic solid electrolyte may include polyethylene derivatives, polyethylene oxide derivatives, polypropylene oxide derivatives, phosphoric ester, poly-agitation lysine, polyester sulfide, polyvinyl alcohol, polyvinylidene fluoride, polymers containing an ionically dissociatable group, or the like.

Particular examples of the inorganic solid electrolyte may include nitrides, halides and sulfates of Li, such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, or the like.

The lithium salt may be a material which is easily dissolved in the non-aqueous electrolyte, and particular examples thereof may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lithium lower aliphatic carboxylate, lithium tetraphenylborate, imide, or the like.

In addition, in order to improve charging/discharging characteristics, flame resistance, or the like, it is possible to add pyridine, triethyl phosphite, triethanol amine, cyclic ether, ethylene diamine, n-glyme, triamide hexaphosphate, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride, or the like, to the non-aqueous electrolyte. Optionally, in order to impart incombustibility, a halogen-containing solvent, such as carbon tetrachloride or ethylene trifluoride, may be further added. In order to improve high-temperature storage characteristics, carbon dioxide gas may be further added and fluoro-ethylene carbonate (FEC), propene sultone (PRS) may also be further added.

According to an embodiment, a lithium salt, such as $LiPF_6$, $LiClO_4$, $LiBF_4$ or $LiN(SO_2CF_3)_2$, may be added to a mixed solvent of a cyclic carbonate, such as ethylene carbonate (EC) or propylene carbonate (PC), as a high-dielectric solvent with a linear carbonate, such as diethyl carbonate (DEC), dimethyl carbonate (DMC) or ethyl methyl carbonate (EMC) as a low-viscosity solvent, thereby providing a lithium salt-containing non-aqueous electrolyte.

In still another aspect, there is provided a battery module including the secondary battery as a unit cell, and a battery pack including the battery module.

The battery pack may be used as an electric power source for devices requiring high-temperature stability, long cycle characteristics and high rate characteristics.

Particular examples of such devices may include but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

MODE FOR DISCLOSURE

The present disclosure will be described more fully hereinafter with reference to examples. The following examples may, however, be provided for illustrative purposes only and the scope of the present disclosure is not limited thereto.

Example 1

Manufacture of Negative Electrode

Spherical natural graphite (average particle diameter ($D_{50}$)=11 μm) as a first negative electrode active material, carbon black as a first conductive material, styrene-butadiene rubber as a binder polymer and carboxyl methyl cellulose (CMC) as a thickener were mixed at a weight ratio of 96:1:2:1, and then further mixed with water ($H_2O$) as a first solvent to obtain a homogeneous first negative electrode mixture.

The first negative electrode mixture was coated on one surface of a copper film current collector to an average loading amount of 30 mg/25 cm$^2$ after drying, and the first negative electrode mixture was allowed to pass through 6 drying ovens in order to dry the solvent. Each of the first to the fifth drying ovens was designed for the purpose of constant-rate drying, had a length of 1500 cm, and maintained at an internal temperature of 65° C. under ambient pressure of 1 atm. The sixth drying oven was designed for the purpose of reduced-rate drying, had a length of 1500 cm, and maintained at an internal temperature of 50° C. under ambient pressure of 1 atm. The first to the sixth drying ovens were maintained at a dew point of −10° C. or less. The first negative electrode mixture was conveyed through the first to the fifth drying ovens at a rate of 0.5 m/min so that the solvent drying rate might be 0.2 mg/sec.

To obtain a second negative electrode active material layer, the second negative electrode mixture was used and coated on the dried first negative electrode active material layer to an average loading amount of 70 mg/25 cm$^2$ after drying. Next, in order to dry the solvent, the second negative electrode mixture was allowed to pass through the six drying ovens. Each of the first to the fifth drying ovens was designed for the purpose of constant-rate drying, had a length of 1500 cm, and maintained at an internal temperature of 65° C. under ambient pressure of 1 atm. The sixth drying oven was designed for the purpose of reduced-rate drying, had a length of 1500 cm, and maintained at an internal temperature of 50° C. under ambient pressure of 1 atm. The first to the sixth drying ovens were maintained at a dew point of −10° C. or less. The second negative electrode mixture was conveyed through the first to the fifth drying ovens at a rate of 0.2 m/min so that the solvent drying rate might be 0.1 mg/sec.

Manufacture of Lithium Secondary Battery

LiCoO$_2$ used as a positive electrode active material, carbon black as a conductive material and PVdF as a binder were mixed at a weight ratio of 94:3.5:2.5 and the resultant mixture was added to N-methyl-2-pyrrolidone (NMP) to obtain positive electrode active material slurry. The slurry was coated on one surface of aluminum foil, dried and rolled, and then punched into a predetermined size to obtain a positive electrode.

A polyolefin separator was interposed between the negative electrode and the positive electrode obtained as described above. Then, an electrolyte containing 1M LiPF$_6$ dissolved in a solvent containing ethylene carbonate (EC) mixed with diethyl carbonate (DEC) at a volume ratio of 30:70 was injected to obtain a coin-type lithium secondary battery.

Comparative Example 1

A negative electrode mixture having the same composition as Example 1 was prepared, except that the negative electrode mixture was not divided into two portions and coated on an electrode current collector to a loading amount of 100 mg/25 cm$^2$ and then dried through six drying ovens. Each of the first to the fifth drying ovens was designed for the purpose of constant-rate drying, had a length of 1500 cm, and maintained at an internal temperature of 65° C. under ambient pressure of 1 atm. The sixth drying oven was designed for the purpose of reduced-rate drying, had a length of 1500 cm, and maintained at an internal temperature of 50° C. under ambient pressure of 1 atm. The first to the sixth drying ovens were maintained at a dew point of −10° C. or less. The negative electrode mixture was conveyed through the first to the fifth drying ovens at a rate of 0.5 m/min so that the solvent drying rate might be 0.2 mg/sec.

Comparative Example 2

A negative electrode was obtained in the same manner as Example 1, except that the first negative electrode mixture and the second negative electrode mixture were conveyed through the first to the fifth drying ovens at the same rate of 0.5 m/min to accomplish the same solvent drying rate of 0.2 mg/sec.

Test Example

Figure 2:
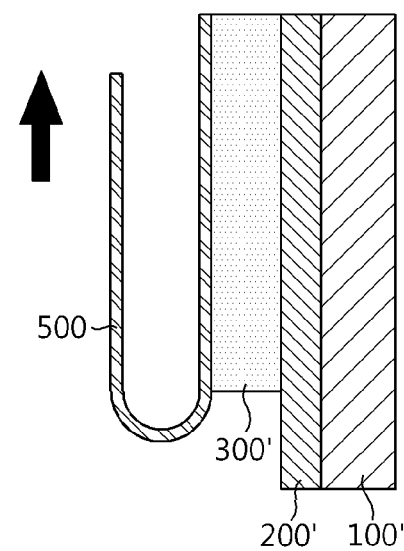
FIG. 2 is a schematic sectional view illustrating a method for determining interfacial adhesion strength between a first electrode active material layer and a second electrode active material layer.
Figure 3:
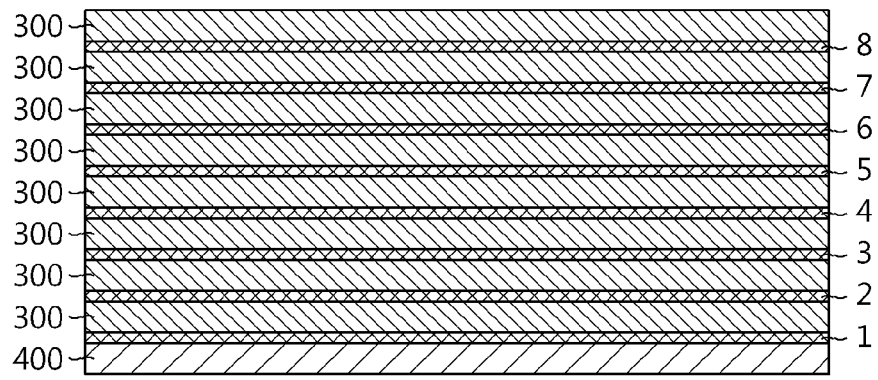
FIG. 3 is a sectional view illustrating an electrode including an electrode current collector and an electrode active material layer, and a portion where peel-off occurs is marked therein.

In the following Test Example, adhesion strength between an electrode current collector and an electrode active material was determined by attaching a double-sided tape onto a glass plate, attaching an electrode surface to the tape and peeling copper foil at 180° as shown in FIG. 1. In addition, as shown in FIG. 2, adhesion strength between electrode active material layers was determined by attaching a tape onto the surface of an active material layer and peeling the tape at 180°. The tape attachment and peel-off were repeated 8 times. As a result, the active material layer 300 on the electrode current collector 400 caused peel-off 8 times as shown in FIG. 3. The peeled portion generated each time was marked as '1' to '8'. Therefore, in FIG. 3, '1' to '8' do not represent any specific elements but represent peeled portions for convenience so that they may be noticed easily. The adhesion strength measured at each of the portions marked as '1' to '8' was shown in FIG. 4.

Figure 4:
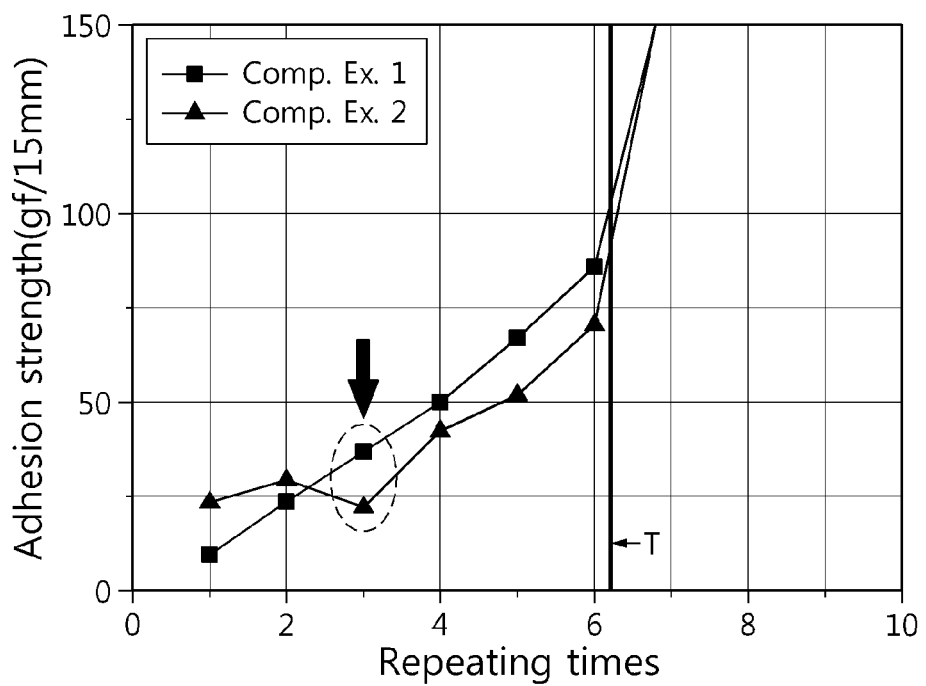
FIG. 4 is a graph illustrating adhesion of each of the electrodes according to Example 1, Comparative Example 1 and Comparative Example 2.

As a result, Comparative Example 1 (single coating) having no interface in the electrode layer shows a relatively constant increase in electrode adhesion strength from the bottom to the top of the electrode, as shown in FIG. 4. Comparative Example 2 (double coating) shows a rapid decrease in adhesion at '3' in X-axis, which corresponds to the interface between the first electrode active material layer and the second electrode active material layer. In addition, after repeating 6 times, most of the electrode layer is peeled off to show the adhesion of the tape ('T' in FIG. 4).

The test results are shown in the following Table 1.

TABLE 1

| | Example 1 | Comp. Ex. 1 | Comp. Ex. 2 |
|---|---|---|---|
| Active material-electrode current collector adhesion strength (gf/10 mm) | 22.65 | 9.41 | 23.33 |
| First electrode active material layer-second electrode active material layer interfacial adhesion strength (gf/10 mm) | 32.54 | 36.85 | 21.95 |

As can be seen from the foregoing, the negative electrode according to the present disclosure, unlike the conventional negative electrode, shows excellent adhesion strength between active material and electrode current collector. In addition, the interfacial adhesion strength between the first electrode active material layer and the second electrode active material layer is significantly higher than the active material-electrode current collector adhesion strength.

Meanwhile, in the case of Comparative Example 2, interfacial adhesion strength between the first electrode active material layer and the second electrode active material layer is lower than adhesion strength between the active material and electrode current collector. However, peel-off occurs in the electrode current collector first. Although the reason is not clear, it is thought that since copper foil and the electrode layer include copper and carbonaceous ingredients, respectively, and significantly different structures join with each other at the interface, peel-off of the electrode current collector occurs before peel-off between the first electrode active material layer and the second electrode active material layer having the same ingredients join with each other at the interface, peel-off of the electrode current collector occurs before peel-off between the first electrode active material layer and the second electrode active material layer having the same ingredients.

In FIG. 1 and FIG. 2, element numbering is as follows:
- 100: a glass plate;
- 100': a glass plate;
- 200: a double-sided tape;
- 200': a double-sided tape;
- 300: an electrode active material;
- 300': an electrode active material after peeling an electrode current collector according to FIG. 1;
- 400: an electrode active material; and
- 500: a tape.

What is claimed is:

1. A method for manufacturing an electrode for a secondary battery, comprising:
   (i) preparing a first electrode mixture for primary coating and a second electrode mixture for secondary coating;
   (ii) coating the first electrode mixture onto an electrode current collector and carrying out drying; and
   (iii) coating the second electrode mixture onto the first electrode mixture and carrying out drying in such a manner that a drying rate of the second electrode mixture is lower than a drying rate of the first electrode mixture in (ii),
   wherein each of the drying rates of the first electrode mixture and the second electrode mixture is within the range of 0.1-30 mg/sec, and
   wherein the first electrode mixture and the second electrode mixture have the same ingredients and compositional ratio.

2. The method for manufacturing an electrode for a secondary battery according to claim 1, wherein the drying rate of the second electrode mixture is lower than the drying rate of the first electrode mixture by 10-20 mg/sec.

3. An electrode for a secondary battery obtained by the method as defined in claim 1, the electrode comprising the electrode current collector, a first electrode active material layer formed from the first electrode mixture and a second electrode active material layer formed from the second electrode mixture, wherein interfacial adhesion strength between the first electrode active material layer and the second electrode active material layer is larger than interfacial adhesion strength between the current collector and the first electrode active material layer, and the first electrode active material layer and the second electrode active material layer have a thickness ratio of 1:9-5:5.

4. The method for manufacturing an electrode for a secondary battery according to claim 1, wherein the drying rate of the second electrode mixture is 30-50% of the drying rate of the first electrode mixture.

* * * * *